United States Patent [19]

Howerton

[11] Patent Number: 4,579,548
[45] Date of Patent: Apr. 1, 1986

[54] BANDED BELT AND METHOD OF MAKING SAME

[75] Inventor: Anderson W. Howerton, Nixa, Mo.

[73] Assignee: Dayco Corporation, Dayton, Ohio

[21] Appl. No.: 232,445

[22] Filed: Feb. 6, 1981

[51] Int. Cl.⁴ .......................... F16G 5/16; F16G 1/26
[52] U.S. Cl. ..................................... 474/238; 474/266
[58] Field of Search ............... 474/238, 260, 262, 264, 474/265, 267, 268

[56] References Cited

U.S. PATENT DOCUMENTS

| | | | |
|---|---|---|---|
| 2,182,461 | 12/1939 | Yeakel | 474/205 |
| 2,446,310 | 8/1948 | Steinke | 474/263 |
| 2,588,647 | 3/1952 | Mitchell | 83/171 |
| 2,684,315 | 7/1954 | Spicer | 474/264 |
| 3,049,460 | 8/1962 | Garbin et al. | 60/260 |
| 3,164,026 | 1/1965 | Terhune | 474/264 |
| 3,523,461 | 8/1970 | Nemecek et al. | 474/167 |
| 3,564,933 | 2/1971 | Clinkenbeard | 474/238 |
| 3,838,605 | 10/1974 | Müller | 474/238 |
| 3,853,017 | 12/1974 | White, Jr. et al. | 474/238 |
| 3,948,113 | 4/1976 | Stork | 474/148 |
| 4,011,766 | 3/1977 | Waugh | 474/238 |
| 4,177,688 | 12/1979 | Howerton et al. | 474/238 |

Primary Examiner—Lawrence J. Staab
Assistant Examiner—Michael D. Bednarek
Attorney, Agent, or Firm—Joseph V. Tassone

[57] ABSTRACT

A banded polymeric endless power transmission belt and method of making same are provided wherein such belt comprises a plurality of laterally spaced belt elements and each of the elements has fabric material defining the exposed surface thereof and a tie band interconnecting the elements with the tie band comprising fabric material; and, the fabric material defining the exposed surfaces and the fabric material comprising the tie band is a single piece of fabric material with such single piece of fabric material having a first portion bonded against top surfaces of the elements, a second portion covering the remaining exposed surfaces of the elements, and a third portion overlying the first portion so that the tie band comprises two layers of the single piece of fabric material.

11 Claims, 4 Drawing Figures

BANDED BELT AND METHOD OF MAKING SAME

BACKGROUND OF THE INVENTION

1. Field of the Invention

This invention relates to a banded endless power transmission belt made primarily of polymeric material and to a method of making such a belt.

2. Prior Art Statement

Banded endless power transmission belts comprised of a plurality of belt elements and a tie band holding the elements together are well known in the art. Such banded belts are commonly used where it is impractical to use a single belt because such single belt cannot be made large enough, from a practical viewpoint, to transmit large rotational forces. Also, banded belts are used in applications where it is not desirable to use a plurality of independent belts because such independent belts may tend to slip or become wedged in their pulley grooves so as to prevent the cooperating action which is required to transmit large rotational forces.

Many types of banded belts have been proposed previously, and particularly in applications where each banded belt has belt elements covered with a suitable cover it is common practice to form and cover a number of belt elements independently and then independently form a tie band for the belt elements whereupon the independently formed belt elements and independently formed tie band are placed in a suitable curing apparatus to achieve simultaneous curing and bonding of the tie band to the belt elements. Following the curing action, the resulting construction is usually slit and trimmed to define banded belts each having the desired number of belt elements. However, the previously proposed belts, made essentially as described herein, are comparatively expensive due to the added maufacturing steps which are required and the tie bands thereof have a tendency to be more easily pulled away from their belt elements.

It is also known in the art to utilize special fabric material in the tie band of a banded belt to provide such tie band with extensibility to take into account various operating conditions.

Examples of banded endless power transmission belts are presented in the following:

A. U.S. Pat. No. 3,523,461
B. U.S. Pat. No. 3,564,933
C. U.S. Pat. No. 3,853,017
D. U.S. Pat. No. 2,182,461

It appears from A that a banded belt is provided in which the tie band is fastened in position by molding such tie band in position against the upper portion of the V-belt elements during the process of making the belt.

It appears from B that a bended belt is provided which comprises fabric covered belt elements and a tie band which uses a stress-relieved fabric which has warps and wefts disposed at an angle to each other which may range between 95° and 155°.

It appears from C that a banded belt is provided which comprises fabric covered belt elements and a tie band which uses a knitted fabric material.

It appears from D that a belt construction is provided which appears to be made as a non-continuous strip which is then fastened by fasteners to define an endless configuration. Rubberized fabric layers are disclosed and it is stated that layers of fabric in the web preferably comprise lateral projections or continuations of the layers in the V portions, and may overlap if desired.

SUMMARY

It is a feature of this invention to provide a simple and economical banded belt in which the tie band thereof has minimum tendency to be pulled away from its belt elements.

Another feature of this invention is to provide an improved banded polymeric endless power transmission belt comprised of a plurality of laterally spaced belt elements and each of the elements has fabric material defining the exposed surface thereof and a tie band interconnecting the elements with the tie band comprising fabric material.

For example, in accordance with one embodiment of this invention the fabric material defining the exposed surface and the fabric material comprising the tie band is a single piece of fabric material with such single piece of fabric material having a first portion bonded against top surfaces of the elements, a second portion covering the remaining exposed surfaces of the elements, and a third portion overlying the first portion so that the tie band is comprised of two layers of the single piece of fabric material.

Another feature of this inventon is to provide an improved method of making a banded polymeric endless power transmission belt of the character mentioned.

Therefore, it is an object of this invention to provide an improved banded belt of the character mentioned and method of making such a belt having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DETAILED DESCRIPTION

Figure 1:
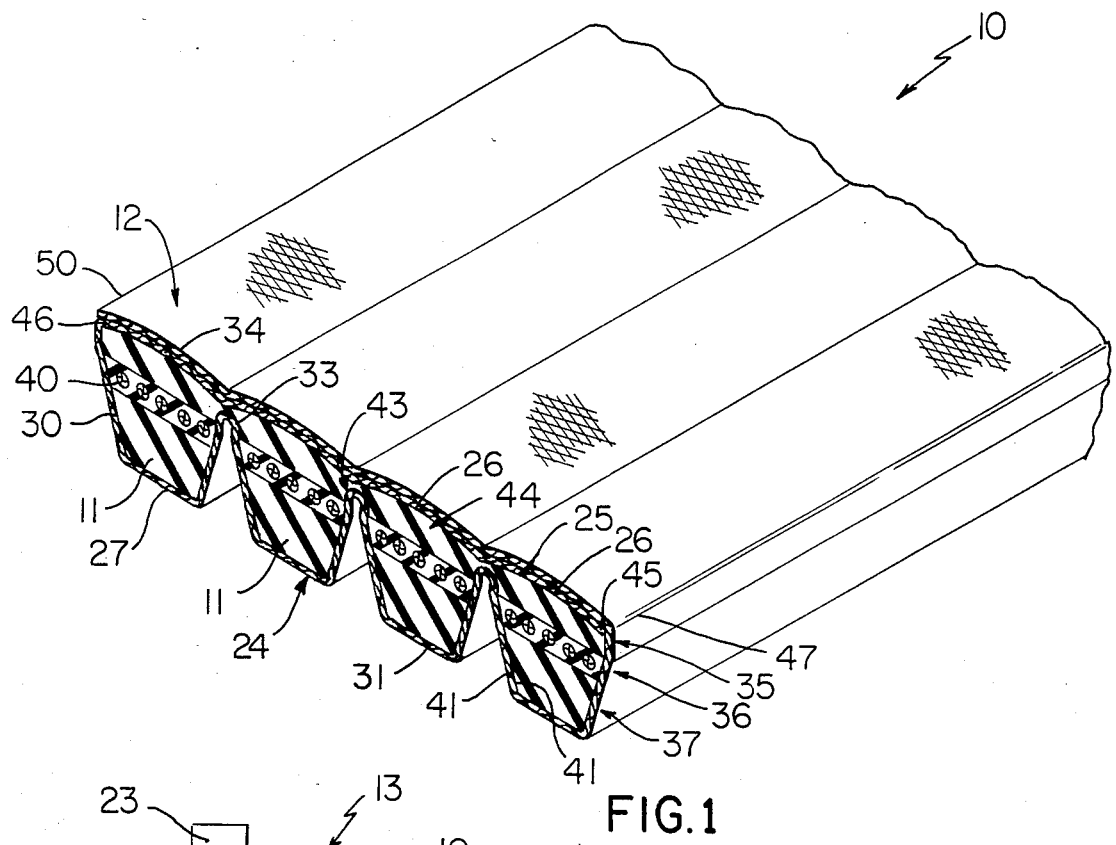
FIG. 1 is an isometric view with parts in elevation, parts in cross section, and parts broken away illustrating one exemplary embodiment of the belt of this invention and method of making such belt.

Reference is now made to FIG. 1 of the drawing which illustrates one exemplary embodiment of a banded endless power transmission belt of this invention which is designated generally by the reference numeral 10. The belt 10 is made primarily of a polymeric material, preferably in the form of an elastomeric material—such as a suitable rubber compound, or the like, and such belt is of simple and economical construction inasmuch as it is made with a minimum of handling during manufacture thereof. The belt 10 is comprised of a plurality of belt elements, each designated by the same reference numeral 11, and a tie band 12 for the elements 11. The belt 10 is a wrapped unitary structure capable of transmitting large rotational forces in an efficient manner.

Figure 2:
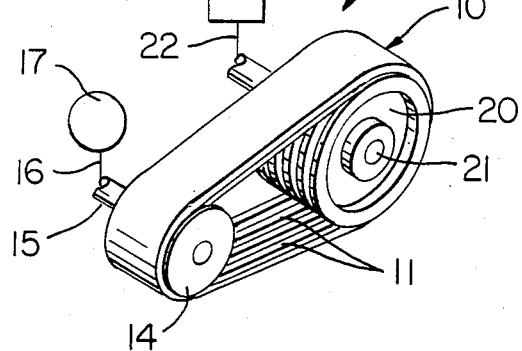
FIG. 2 is an isometric view, with certain components shown schematically, particularly illustrating the belt of FIG. 1 installed in a drive system comprising a driving sheave and a driven sheave.

The belt 10 is particularly adapted to be operated in a drive system, which is designated generally by the reference numeral 13 in FIG. 2 of the drawing; and, such drive system is of a type wherein large rotational forces must be transmitted by the belt 10.

The drive system 13 comprises a driving sheave 14 which has a drive shaft 15 suitably fixed thereto; and, the shaft 15 is suitably operatively connected by a mechanical connection 16 to a drive motor 17, which may be an electric drive motor. The drive system 13 also comprises a driven sheave 20 which has a driven shaft 21 suitably fixed thereto; and, the shaft 21 is operatively connected by a mechanical connection 22 to a suitable load apparatus 23, which is to be driven by the drive system 13. The belt 10 is effective in transmitting larg rotational forces from the driving sheave 14 to the driven sheave 20 and in its connected apparatus 23 under all operating conditions including starting conditions, continuous running conditions, and the like.

As previously indicated the belt 10 comprises a plurality of laterally spaced belt elements 11 and in this example of plurality of four elements are illustrated. Each of the elements 11 has fabric material 24 defining the exposed surface thereof; and, the tie band 12 is also comprised of fabric material as will now be explained.

In particular, the fabric material 24 defining the exposed surface of the elements 11 and the fabric material comprising the tie band 12 is a single piece of fabric material. The single piece of fabric material has a first portion 25 bonded against the top sufaces, each designated by the same reference numeral 26, of the elements 11 and a second portion covering the remaining exposed surfaces of the elements with such second portion being designated by the reference numeral 27.

The second portion 27 of the fabric 24 covers the sides of each element with each side of each element being designated by the same reference numeral 30. The second portion 27 also covers the bottom or inside surface 31 of each element, whereby such second portion extends in an undulating path, conforming to the belt elements, across the width of the belt 10. The second portion 27 of the fabric 24 at each location between each immediately adjacent pair of elements 11 has a downwardly opening channel portion 33 of substantially semicircular cross-sectional configuration as indicated at a typical location in FIG. 1.

The fabric 24 has what will be referred to as a third portion 34 thereof overlying the first portion 25 so that the tie band 12 comprises two layers of the fabric material. The third portion 34 is substantially coextensive with and has approximately the same area as the first portion 25.

Each belt element 11 is a basically independent construction of substantially trapezoidal cross-sectional configuration as will be readily apparent from FIG. 1 of the drawing. Accordingly, each belt element has a tension section 35, a load carrying section 36, and a compression section 37. Each of the sections 35, 36, 37 is made primarily of polymeric material which in this example is preferably in the form of a suitable rubber compound and may be either a natural rubber or a synthetic rubber, or the like. Further, the load-carrying section 36 is preferably comprised of a helically wound load-carrying cord 40 of any suitable type employed in the art of making endless power transmission belts.

The single piece of fabric material 24 comprising the banded belt 10 preferably has a polymeric layer disposed against at least one surface thereof. In this example of the invention a polymeric layer is provided on both of its surfaces and each of such layers is designated by the same reference numeral 41. The polymeric layers 41 serve to bond the first portion 25 and the third portion 34 together during the process of making the banded belt 10 and the inner one of such layers serves to provide a tenacious bond between the fabric matrial 24 and the exposed lower surfaces of the belt elements 11. The first portion 25 and third portion 34 of the fabric material 24 and the polymeric layers 41 are the only structural portions defining the tie band 12.

In this disclosure of the banded belt 10 the construction and arrangement of the belt elements 11 are such that the inside surface of the first portion 25 of the fabric material is slightly spaced from the portions 33 of the second portion 27 of fabric material 24 as illustrated at a typical location 43 in FIG. 1. However, it is to be understood that the first portion 25 of fabric material may be in contact with portions 33 at locations 43, if desired.

Each of the belt elements 11 has an outwardly convex configuration as indicated at 44 for a typical belt element. Accordingly, the tie band 12 has an undulating configuration defined by the outwardly convex configurations of the belt elements 11.

The belt 10 comprises a pair of elements 11 defining opposite sides of such belt; and, it will be seen that the first portion 25 of fabric material 24 has what will be referred to as a free side edge 45 overlying and adjoining an outer side edge of one of the pair of elements, shown as the right element 11 in FIG. 1. The first portion 25 also has an inner portion 46 overlying and adjoining an outer side edge of the other of the pair of elements 11, shown as the outer element at the left of the belt construction 10 as viewed in FIG. 1. Similarly, the third portion 34, after wrapping the second portion 27 in position around the remaining portions or uncovered parts of the belt elements 11, has an inner portion 47 overlying and adjoining the free side edge 45 and such third portion 34 has a terminal side edge 50 overlying and adjoining the inner portion 46 of the first portion 25. With this detailed construction it will be seen that basically only one side edge of the single piece of fabric material 24 is exposed.

The above reference to exposed side edge of fabric material is intended to define such side edge which is concealed except for polymeric material provided as a layer 41 against the outside surface of the fabric 24. The banded belt 10, thus wrapped, with the single piece fabric cover 24 has minimum tendency to become unwrapped. Also the banded belt 10 may be operated under adverse operating conditions including environments which ordinarily tend to attack exposed fabric edges of a belt construction.

Figure 3:
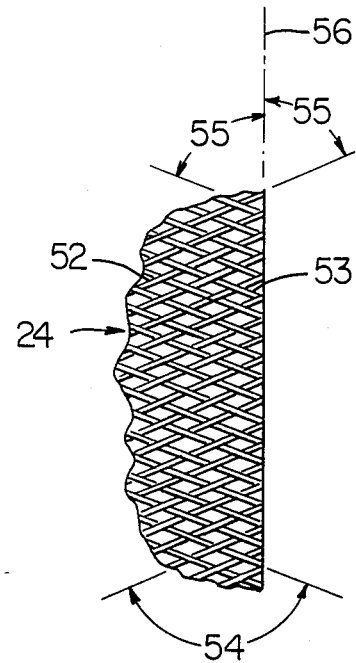
FIG. 3 is a fragmentary plan view illustrating one exemplary embodiment of fabric material that may be utilized in the belt of FIG. 1.

The tie band 12 of the belt 10 allows tie band extensibility between the belt elements 11 to assure efficient engagement of each element with opposed surfaces comprising a groove of an associated sheave, yet the tie band holds the elements 11 together with minimum tendency for the band to shear between belt elements. To provide these performance characteristics the tie band may utilize what is commonly referred to in the art as a stress-relieved fabric; and, a fragmentary portion of stress-relieved fabric is illustrated in FIG. 3 and designated by the reference numeral 24.

The stress-relieved fabric is comprised of warp threads or warps 52 which are disposed in parallel relation and cooperating weft threads or wefts 53 which are disposed transverse the warps 52. Preferably the warps 52 and wefts 53 are disposed at an angle 54 to each other, i.e., therebetween, ranging between roughly 120° and 155°. The included angle 54 in this example is shown as being roughly 140°. The utilization of stress-relieved fabric 24 having warps and wefts disposed at an obtuse angle of at least 120° therebetween assures that the single piece fabric 24 may be disposed in the manner described previously and about the entire belt construction to cover the belt elements 11 as well as define the improved two layer tie band 12 yet allowing the belt elements and tie band to be free of stresses which are created when a less stretchable fabric is employed.

The warps 52 and wefts 53 are each disposed transverse and roughly at the same angle relative to the longitudinal axis of the belt 10. To illustrate this point a dot-dash line 56 is illustrated in FIG. 3 to represent the longitudinal axis of the belt 10 and the warps 52 and wefts 53 are disposed at the same angle 55 relative to such axis 56.

Figure 4:
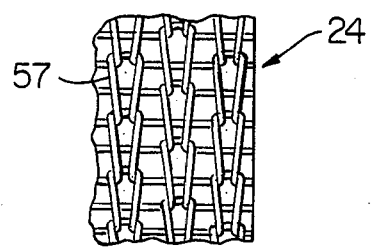
FIG. 4 is a view similar to FIG. 3 illustrating another exemplary embodiment of fabric material which may be utilized in the belt of FIG. 1.

Instead of a stress-relieved fabric, the single piece fabric material may be a knitted fabric material or the like, as shown in FIG. 4 and also designated by the reference numeral 24. The knitted fabric 24 is comprised of knitted filaments or yarns designated by the reference numeral 57. In a similar manner as described earlier, the knitted fabric 24 is disposed with the first portion 25, second portion 27, and third portion 34 in position in a manner previously described. The knitted fabric holds the elements 11 together while allowing the previously described extensibility of the tie band 12 between belt elements even under adverse operating conditions. The knitted fabric 24 maintains high structural integrity in the tie band 12 at locations between the belt elements 11.

The stress-relieved fabric 24 of FIG. 3 and the knitted fabric 24 of FIG. 4 may be utilized in defining the belt 10; however, it will be appreciated that other fabrics may also be utilized which have characteristics similar to the characteristics of the stress-relieved and knitted fabrics described above.

It will also be appreciated that either the stress-relieved fabric 24 or the knitted fabric 24 may have a polymeric layer such as a layer of rubber 41 applied against one or both of its surfaces prior to wrapping the single piece fabric in position to define a banded belt construction or belt 10. The polymeric or rubber layer 41 may be applied using any technique known in the art such as frictioning, skim coating, calendering, and the like.

The method of making the belt of this invention will be readily apparent from FIG. 1 of the drawing and it will be appreciated that such method comprises the steps of forming a plurality of uncured endless belt elements 11 primarily of uncured polymeric material, such as, any suitable rubber compound, disposing the uncured elements 11 in equally spaced apart parallel relation, wrapping the inner and side portions of each of the elements with fabric material 24, placing fabric material 24 over the outer portions of the elements wherein the elements with the fabric material wrapped and placed in position define an uncured belt construction, and curing the construction to cure the polymeric material and bond the fabric material in position to define a banded belt.

In accordance with the teachings of this invention the fabric material 24 is a single piece of fabric material. Further, the wrapping step comprises disposing a central portion (referred to as the second portion 27 in the completed belt 10) of the single piece of fabric material 24 around a suitable building drum of known construction having identical spaced annular grooves therein which define the outer configurations of the belt elements. The placing step is achieved following the wrapping step and comprises placing a first portion 25 of the single piece of fabric material which is the remaining material on one side of said central portion over the outer portion of the elements. The method comprises the further step following the placing step of folding a third portion 34 of the single piece of material which is the remaining material on the opposite side of the central portion so that it overlies the first portion 25. The placing and folding steps result in the belt construction and banded belt 10 defined therefrom having a tie band consisting of two layers of the single piece of fabric material.

The fabric material may be a stress-relieved woven fabric material 24, as previously described. The material 24 has warps and wefts enabling the wrapping, placing, and folding steps to be achieved with the fabric material remaining free of stresses therein. Further during the wrapping step of wrapping is achieved so that the warps and wefts of the fabric material are disposed roughly at the same angle relative to the longitudinal axis of the belt. In applications where the fabric material is a knitted fabric material 24 the wrapping, placing, and folding steps are also readily achieved with the knitted material remaining free of stresses therein.

The forming of the uncured belt elements is achieved as is known in the art and each is formed having a substantially trapezoidal cross-sectional configuration and an outwardly convex top surface. It will be appreciated that following the curing step the tie band has a undulating configuration defined by the convex configurations of the belt elements.

The curing step in this example comprises disposing a curing jacket around and against the belt construction to define as assembly consisting of the building drum, uncured belt construction, and curing jacket and such assembly is then subjected to a controlled environment for curing purposes. The controlled environment preferably comprises subjecting the above-mentioned assembly to steam under a controlled temperature and pressure using techniques which are known in the art.

The uncured belt elements 11 in this example are made of an uncured rubber compound. Further, during curing, final shaping of the belt elements is achieved by the surfaces defining the grooves of the building drum, as is known in the art. In addition, cooling of the cured banded belt is also achieved using techniques which are known in the art.

In this disclosure of the invention the banded belt 10 is shown having a plurality of four belt elements 11; however, it is to be understood that such banded belt may have any desired number of belt elements. Further, regardless of the number of belt elements the banded belt of this invention is made so that it has the required number of completed elements thereby eliminating the need for slitting and trimming operations. In addition, the utilization of a single piece of fabric material results in the completed banded belt having a minimum number of exposed fabric edges.

Terms such as top, bottom, side, outer, inner, and like terms have been used throughout this disclosure; however, it is to be understood that these terms are generally presented with reference to the arrangement of components in FIG. 1 of the drawings, for ease of description of the invention. Obviously, the belt 10 may be oriented in any desired manner.

While present exemplary embodiments of this invention, and methods of practicing the same, have been illustrated and described, it will be recognized that this invention may be otherwise variously embodied and practiced within the scope of the following claims.

What is claimed is:

1. In a banded polymeric endless power transmission belt comprising, a plurality of laterally spaced belt elements that initially were separate from each other, each of said elements having fabric material defining the exposed surface thereof and extending between adjoining elements to interconnect said elements, and a tie band also interconnecting said elements, said tie band comprising fabric material, the improvement in which said fabric material defining said exposed surface and said fabric material comprising said tie band is a single piece of fabric material having a first portion bonded against substantially all of the area of the top surfaces of said elements, a second portion covering the remaining exposed surfaces of said elements, and a third portion substantially completely overlying said first portion so that said tie band comprises two layers of said fabric material throughout substantially the entire area of said tie band.

2. A belt as set forth in claim 1 in which said single piece of fabric material has a polymeric layer disposed against at least one surface thereof, said polymeric layer serving to bond said first and third portions together, said first and second portions of fabric material and said polymeric layer being the sole structure defining said tie band.

3. A belt as set forth in claim 1 in which said fabric material is a stress-relieved woven fabric.

4. A belt as set forth in claim 3 in which said woven fabric has warps and wefts each disposed transverse and at roughly the same angle relative to the longitudinal axis of said belt, said warps and wefts also being disposed at an angle of roughly 120° therebetween.

5. A belt as set forth in claim 4 in which said warps and wefts are disposed at an angle ranging between roughly 120° and 155°.

6. A belt as set forth in claim 1 in which said fabric material is a knitted fabric material.

7. A belt as set forth in claim 1 in which each of said elements has an outwardly convex configuration and said tie band has an undulating configuration defined by the outwardly convex configurations of said belt elements.

8. A belt as set forth in claim 1 in which said elements comprise a pair of elements defining opposite sides of said belt, said first portion has a free side edge overlying and adjoining an outer side edge of one of said pair of elements, said first portion also has an inner portion overlying and adjoining an outer side edge of the other of said pair of elements, said third portion has an inner portion overlying and adjoining said free side edge, and said third portion has a terminal side edge overlying and adjoining said inner portion of said first portion.

9. A belt as set forth in claim 8 in which each of said belt elements has a substantially trapezoidal cross-sectional configuration.

10. A belt as set forth in claim 8 in which each of said elements has an independent tension section, load-carrying section, and compression section.

11. A belt as set forth in claim 10 in which each of said elements has a helically wound load-carrying cord defining its load-carrying section.

* * * * *